Sept. 16, 1969  KATSUJI FUJIWARA  3,467,309
DISK-TYPE STEAM TRAP HAVING MOVABLE BIMETALLIC ELEMENT
Filed April 18, 1967

INVENTOR
KATSUJI FUJIWARA

United States Patent Office 3,467,309
Patented Sept. 16, 1969

3,467,309
DISK-TYPE STEAM TRAP HAVING MOVABLE BIMETALLIC ELEMENT
Katsuji Fujiwara, 191, Nishitani, Hiraoka-cho,
Kakogawa-shi, Hyogo-ken, Japan
Filed Apr. 18, 1967, Ser. No. 631,687
Claims priority, application Japan, Apr. 22, 1966,
41/25,756
Int. Cl. F16t 1/08
U.S. Cl. 236—59                                11 Claims

ABSTRACT OF THE DISCLOSURE

A steam trap construction includes a valve body having an inlet opening at one end and a discharge opening at the opposite end and with a raised central portion defining a valve seat defined by two raised annular seat portions, one of which communicates with the discharge opening and the other of which communicates with the inlet opening. The raised portion is closed by a cap member and a disk valve is disposed to overlie each of the annular portions and enclose both the inlet and outlet. The disk may move upwardly away from the seat during operation. A bimetallic member is disposed between the disk valve and the valve body adjacent the valve seat and is movable upon changes of temperature between a position blocking the seating of the valve disk on the valve seat to a position freeing the disk for seating on the valve seat.

SUMMARY OF THE INVENTION

This invention relates in general to steam traps and in particular to a new and useful steam trap having a disk valve which is adapted to seat over inner and outer circular valve seats to provide for fluid passage from an inlet port within the inner valve seat to a discharge port between the valve seats and wherein a bimetallic element is employed for regulating the seating of the disk valve on the valve seats during the operation thereof.

In the operation of disk-type thermodynamic steam traps, a disk valve is pushed up from its valve seat owing to the impact force of condensate which is then permitted to discharge through the trap. When the steam begins to flow, the disk valve will be moved downwardly on the valve seat. In this case, when air flows instead of steam, the disk valve is also closed. In addition, a portion of the air enters a pressure chamber and makes the trap non-operative because the pressure in the pressure chamber defined around the valve seat will not decrease fast enough to open the valve due to the noncondensability of the air. This undesirable operating characteristic is referred to as "air binding." Such air binding may be divided into two types:

(1) An initial air binding which occurs at the time of starting up of the apparatus; and
(2) An air binding which occurs owing to the accumulation of a small amount of air contained in the steam during the normal operation of the trap.

The disk-type steam trap is particularly subject to air binding at the time of starting up.

In accordance with the present invention, there is provided a steam trap having a body portion with an inlet at one end and an outlet at another end and with a central portion defining a valve seat which may be closed by a disk valve to prevent fluid passage from the inlet over the valve seat to the outlet. In order to provide for a control of the seating of the disk member over the valve seat and thus to regulate the fluid flow from the inlet to the discharge of the trap, there is provided an annular bimetallic element or ring with a gap which permits expansion and contraction of the ring during changes of temperature. In addition, the area in the vicinity of the valve seat is provided with a flat surface and an inclined surface adjacent the flat surface to permit the ring to shift during expansion and contraction between a position at which it may ride downwardly on the inclined surface or upwardly onto the flat surface. In the upper position of the ring it will interfere with the complete closing of the valve seat by the disk valve. The arrangement may be such that the ring member may contract for closing the valve or may contract for opening the valve. In one embodiment expansion of the bimetallic ring will move the ring upwardly to the flat surface at which it projects above the valve seat and interferes with the seating of disk valves on the seat. In another arrangement the bimetallic member will move outwardly on expansion and off a high flat surface onto an inclined outer surface and move downwardly to permit closing of the valve seat by the disk member. In addition, a further variation may be obtained in respect to the location of the flat and inclined surfaces over which the ring member is movable. In one embodiment, the surfaces are arranged exteriorly of an outer ring forming an outer valve seat, and in another arrangement they are disposed between inner and outer rings forming inner and outer valve seats for the disk valve. The location of the planar surface and the inclined surface in respect to the valve seat will depend, of course, on the type of ring which is employed and as to whether or not the bimetallic element thereof provides for an expansion or a contraction of the ring during an increase in temperature.

An advantage of the present invention is that the vacuum breaker which was in common use for preventing steam traps from becoming damaged due to the atmospheric pressure when the steam is turned off is no longer required. The bimetallic ring member will push up the disk valve when the steam is turned off, and therefore if there is any vacuum formed in the equipment, it will be broken by the air introduced through the trap orifice from the discharge side.

Accordingly, it is an object of the invention to provide a steam trap which is not subject to air binding and which advantageously includes temperature responsive means for controlling the seating of a disk valve in respect to a valve seat.

A further object of the invention is to provide a thermostatic means for forcibly opening a valve member so that it will not remain closed because of an accumulation of air in any portion thereof.

A further object of the invention is to provide a steam trap of simple configuration which includes a valve body having an inlet on one end and an outlet at another end with passages extending from the inlet and outlet to spaced inner and outer valve seats which are closable by a disk valve which is sealed in a space over the valve seats defined by a cap member, and wherein a thermostatic ring member is movable adjacent the valve seat so as to project above the seat to lift the disk valve off the seat during operation of the valve at a predetermined temperature condition.

A further object of the invention is to provide a steam trap which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION

Figure 1:
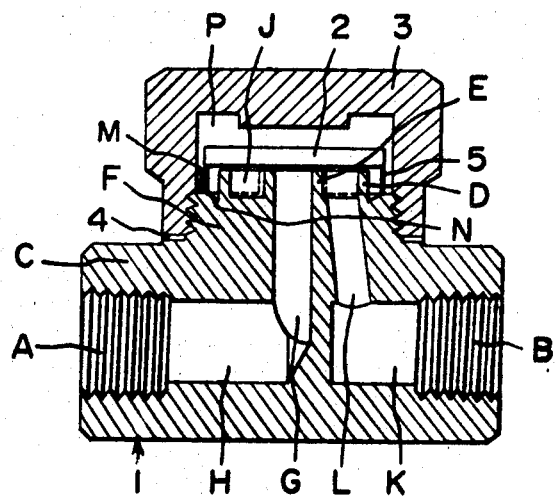
FIG. 1 is an axial sectional view of a steam trap constructed in accordance with the invention.
Figure 2:
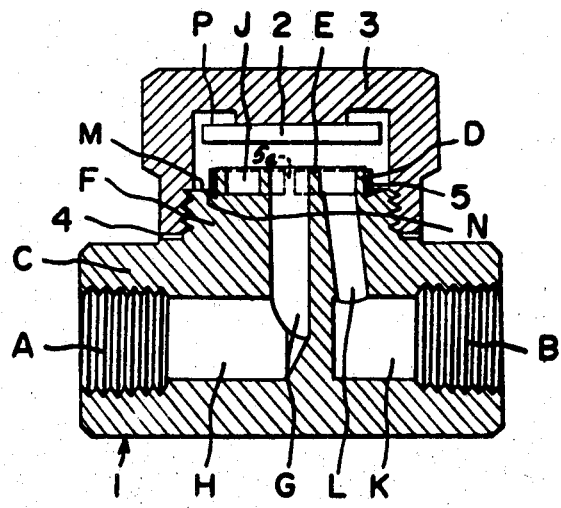
FIGS. 2 and 3 are views similar to FIG. 1 indicating the disk valve and bimetallic element in various operative conditions.
Figure 3:
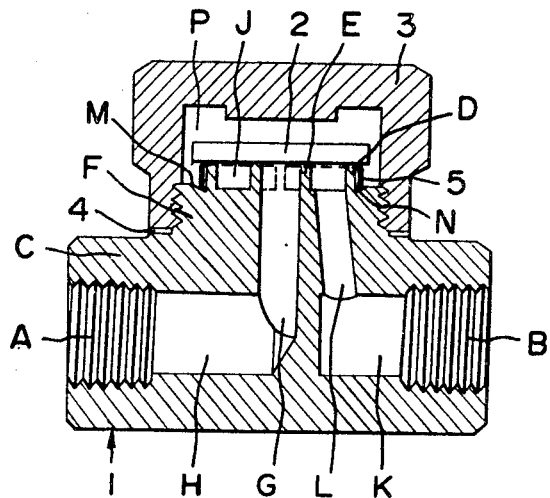

Referring to the drawings in particular, the invention as embodied therein in FIGS. 1, 2 and 3 comprises a steam trap generally designated 1 having a body portion C with an internally threaded inlet A and an internally threaded outlet B for connecting the inlet pipe of the condensate at one end of the body and the discharge pipe of the condensate at the other end of the body. The valve body C includes a widened or raised central portion F which is externally threaded for receiving the internal threads of a cap member or lid 3. The raised portion F is provided with an outer annular projection defining an outer valve seat D and an inner annular projection defining an inner valve seat E. The inner and outer valve seats E and D are closable by a valve disk 2 which rides in the chamber P defined by the interior of the lid 3. A blowout port G is connected at its one end to an inlet chamber H and the inlet A and terminates at its other end within the inner valve seat E. An annular groove J defined between the inner valve seat E and the outer valve seat D communicates with a discharge port L which connects at its opposite end to an outlet chamber K and the discharge B.

In accordance with the invention, the position of the disk valve in relation to the valve seats E and D is controlled in a positive manner by a bimetallic element or ring member 5 which, as indicated in FIG. 1, rides on a planar surface M but is movable upon contraction along an inclined surface N. To facilitate expansion and contraction, the ring member is provided with a gap or separation 5a as indicated in FIG. 2.

In the embodiment of FIGS. 1–3, the planar surface M is defined on the exterior of the central part F and the inclined surface extends inwardly therefrom toward the outer valve seat D. In the expanded condition, for example, during starting up, the bimetallic element 5 rests on the planar surface M at which its upper end projects above the valve seat plane and raises the disk valve 2 off the seat. As indicated in FIG. 2, when the gap 5a becomes smaller upon contraction of the bimetallic element 5, for example, during normal operation the element will ride downwardly on the inclined surface N so that its top will no longer project above the seats E and D so that the disk 2 may fully close the valve.

The operation of the device in respect to FIGS. 1, 2 and 3 is as follows:

When the trap is not used, the bimetallic ring 5 expands and slides upwardly along the conical surface N to the planar surface M and pushes the disk valve 2 upwardly so that the blowout port G will communicate with the discharge port L. Steam begins to pass and first the air and then the condensate passes through the blowout port G and the discharge port L and are continuously discharged toward the condensate outlet B. During this period the bimetallic ring 5 remains on the planar area M in a stable position even if the metallic ring is pushed downwardly by the disk valve 2. This assures that the air and the cool condensate are correctly discharged at the time of starting up. The planar area M insures that the ring will not be forced downwardly by the action of the disk valve 2 along the inclined surface N at times when there is no change of temperature.

When air is replaced by steam, the bimetallic ring 5 is heated and expanded and the width of the gap 5a will vary to cause the ring to contract and move downwardly along the inclined surface N and permit the disk valve 2 to operate freely. The disk valve will then close in a moment owing to the drop in dynamic pressure of steam flowing under the lower surface of the disk valve and when the condensate begins to flow in again, the condensate will be discharged according to the operating characteristics of a disk-type steam trap.

With the valve construction of the invention, the air will always be purged from the pipelines at the time of starting up, and this can be carried out smoothly even if the chamber P is filled with air. This is because the bimetallic ring upon expansion (for example, due to the temperature drop caused by the spontaneous heat radiation of the trap) will rise upwardly along the conical surface N to the planar surface M and lift the disk valve 2 off the seat to permit discharge of the air under pressure in the chamber P. The inclined surface N provides an axial component force which permits a gentle lifting of the valve disk from its associated valve seats.

It is possible with the invention to use ring members 5 of different characteristics. For example, the ring member 5 may have a metal on the exterior side thereof which is of a higher coefficient of thermal expansion than the metal on the interior side so that when the temperature becomes higher, the diameter of the ring will become smaller or the reverse may be true so that when the temperature becomes higher the diameter of the ring will become larger. Therefore, in accordance with which type of ring is selected, the location of the planar surface M and the inclined surface N are oriented either on the inside or on the outside in accordance with which direction of movement can be expected from the ring upon an increase in temperature.

Figure 4:
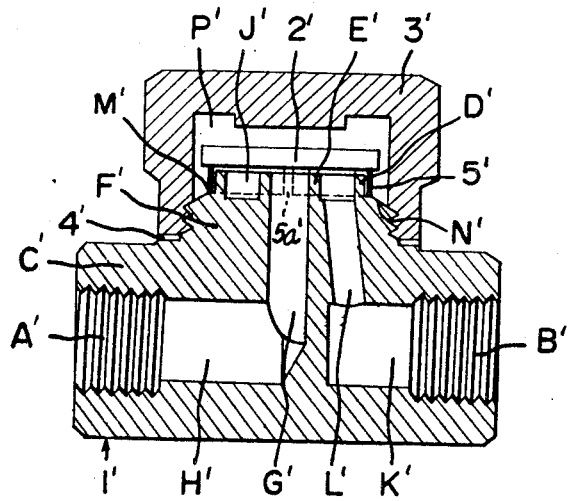
FIGS. 4 to 6 are views similar to FIGS. 1, 2 and 3 of another embodiment of the invention.
Figure 5:
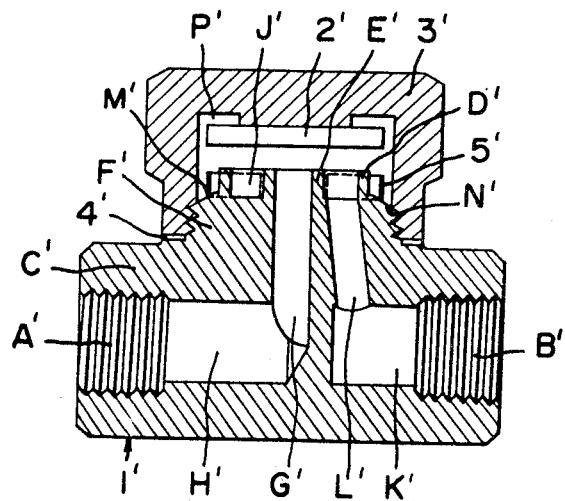
Figure 6:
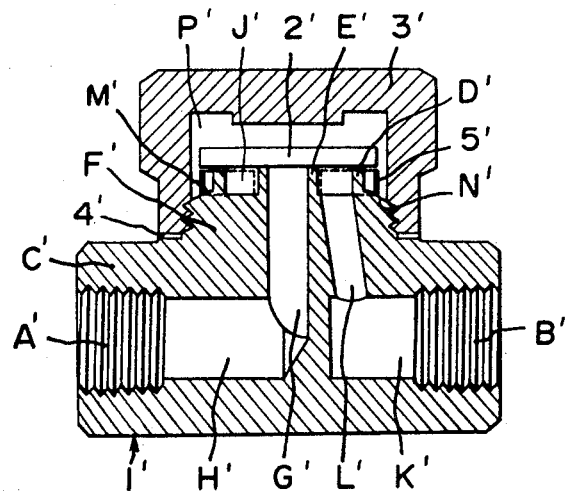

In the embodiment of the invention indicated in FIGS. 4 to 6, similar parts are similarly designated but with a prime added. In this embodiment, the planar or flat surface M' is located inwardly from the inclined surface N'. Thus, upon expansion of the ring 5', it moves from the flat surface M' at which it blocks the seating of the disk valve 2' down to the inclined surface N' at which the valve is free to seat on the seats D' and E'.

Figure 7:
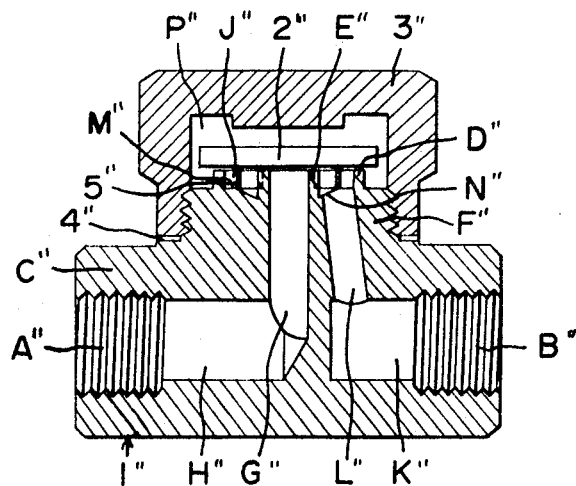
FIGS. 7, 8 and 9 are views similar to FIGS. 1, 2 and 3 of still another embodiment of the invention.
Figure 8:
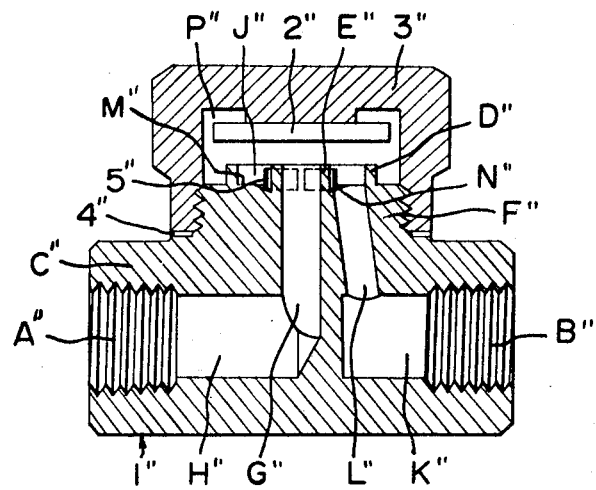
Figure 9:
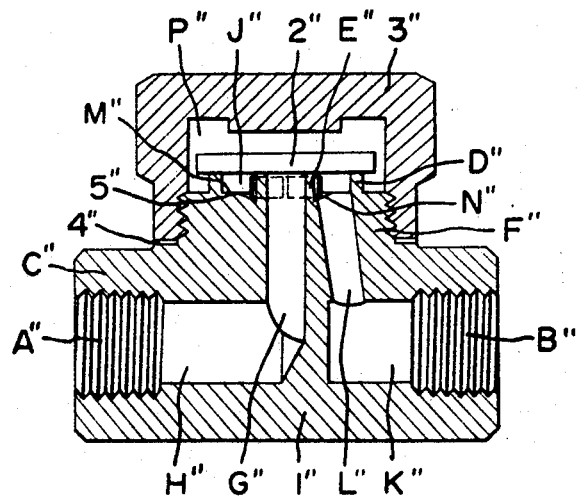

In the embodiment of FIGS. 7, 8 and 9, similar parts are similarly designated but with double primes added. In this embodiment, the flat surface M'' is located directly adjacent the projection E'' forming the inner valve seat and the inclined surface N'' is located outwardly therefrom but between the inner valve seat E'' and the outer valve seat D''. In the embodiment of FIGS. 4, 5 and 6, the bimetallic ring 5' contracts when cooled, but in the embodiment of FIGS. 7, 8 and 9 the bimetallic ring expands when cooled.

Figure 10:
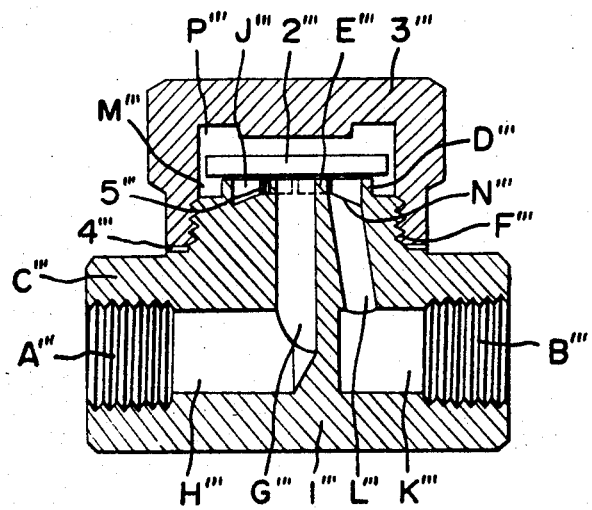
FIGS. 10, 11 and 12 are views similar to FIGS. 1, 2 and 3 of still another embodiment of the invention.
Figure 11:
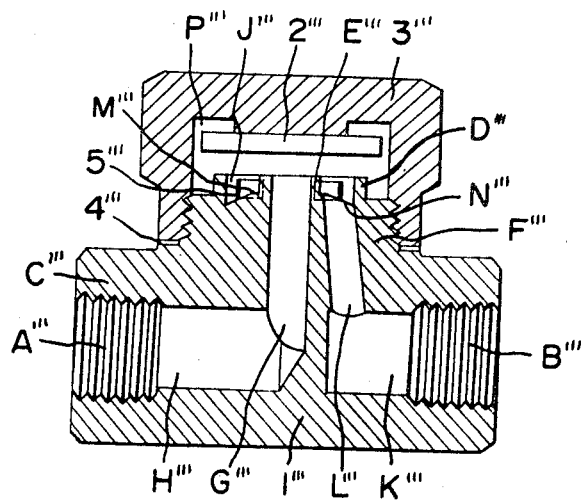
Figure 12:
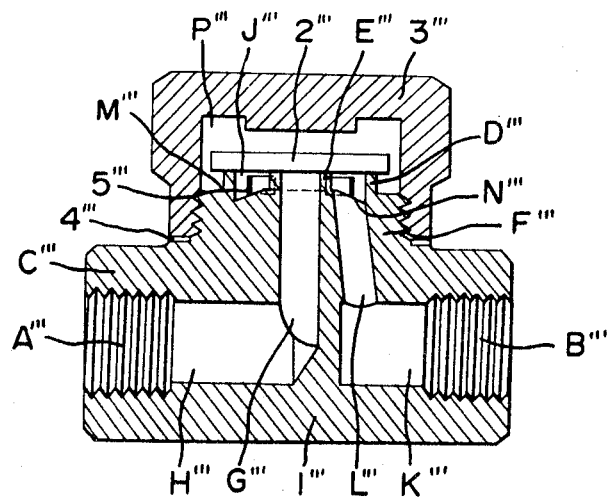

In the embodiment of FIGS. 10, 11 and 12, the parts are similarly designated but with a triple prime. In this embodiment, the flat surface M''' is defined immediately adjacent the inner valve seat E''' and the inclined surface N''' is located outward of the surface M''' but not beyond the outer valve seat D'''. In this embodiment, the bimetallic ring 5''' which surrounds the inner valve seat E''' contacts when cooled and is lowered when it moves outwardly on the inclined surface N''' during expansion.

While specific embodiments of the invention have been shown and described in detail to illustrate the application of the inventive principles, it will be understood that the invention may be embodied otherwise without departing from such principles.

What is claimed is:

1. A steam trap comprising a valve body having an inlet opening and a discharge opening spaced from said inlet opening, a valve seat defined on said valve body, an inlet port communicating with said inlet opening and terminating in said valve seat, an outlet port communicating with said outlet opening and terminating in said valve seat, a disk valve engageable over said valve seat and closing the communication between said inlet port and said outlet port, cover means surrounding said seat and defining a chamber in which said disk valve is confined for movement, and a bimetallic member disposed between said disk valve and said valve body adjacent said valve seat and being movable upon changes of temperature between a position blocking seating of said disk valve on said valve seat and a position freeing said disk valve for seating on said valve seat, said valve seat comprising an inner annular projection defining an inner valve seat portion on an outer annular projection spaced from said inner annular projection and defining an outer seat portion, said inner and outer valve seat portions having annular planar surfaces disposed in a common plane which are engaged by said disk valve, said inlet port terminating on the interior of said inner annular valve seat, said outlet port terminating between said inner and outer annular valve seats.

2. A steam trap according to claim 1, including a planar surface and an inclined surface adjacent said planar surface surrounding said valve seat, said bimetallic member comprising a ring adapted to be positioned on said planar surface and to project when positioned thereon above the surface of said valve seat to hold said disk valve off said valve seat, said bimetallic member being movable along said inclined surface upon temperature change to move it to a position below the planar surface position to permit said discharge to move freely to move said valve seat.

3. A steam trap according to claim 2, wherein said planar surface is located radially outwardly from said inclined surface.

4. A steam trap according to claim 2, wherein said inclined surface is located radially outwardly from said planar surface.

5. A steam trap according to claim 2, wherein said planar and said inclined surfaces are located exteriorly of said valve seat.

6. A steam trap according to claim 2, wherein said inclined surface and said planar surface are defined at a location within said valve seat.

7. A steam trap comprising a valve body having an inlet opening and a discharge opening spaced from said inlet opening, a valve seat defined on said valve body, an inlet port communicating with said inlet opening and terminating in said valve seat, an outlet port communicating with said outlet opening and terminating in said valve seat, a disk valve engageable over said valve seat and closing the communication between said inlet port and said outlet port, cover means surrounding said seat and defining a chamber in which said disk valve is confined for movement, and a bimetallic member disposed between said disk valve and said valve body adjacent said valve seat and being movable upon changes of temperature between a position blocking seating of said disk valve on said valve seat and a position freeing said disk valve for seating on said valve seat, said valve seat including an inner annular seat surface and an outer annular seat surface spaced radially outwardly from said inner annular surface and arranged concentrically therewith, said disk valve having a flat surface engageable over the annular ends of said inner and outer valve seats, a planar surface defined adjacent said valve seat and an inclined surface defined radially outwardly from said planar surface, said bimetallic member being disposable on said planar surface at which position said ring member projects above said valve seat and prevents said disk valve from seating thereon, said bimetallic ring member being movable upon a temperature change outwardly along the inclined surface so that it no longer projects above said valve seat to block the seating of said disk valve.

8. A steam trap according to claim 7, in which said planar surface and said inclined surface are located exteriorly of said outer annular valve seat.

9. A steam trap according to claim 7, wherein said planar surface and said inclined surface are located between said inner and outer annular seat portions.

10. A steam trap according to claim 9, wherein said inclined surface is located directly adjacent said inner annular valve seat, said planar surface being located adjacent said outer annular valve seat.

11. A steam trap according to claim 7, wherein said planar surface is located adjacent said inner annular valve seat portion, said inclined portion being located exteriorly of said planar surface.

References Cited

UNITED STATES PATENTS

| | | | |
|---|---|---|---|
| 1,163,316 | 12/1915 | Brown | 236—59 X |
| 1,656,392 | 1/1928 | Russell | 236—59 |
| 2,817,353 | 12/1957 | Midgette | 137—200 X |

FOREIGN PATENTS 1,142,176  1/1903  Germany.

ALAN COHAN, Primary Examiner

U.S. Cl. X.R.

137—183